United States Patent
Rai et al.

(10) Patent No.: US 9,860,698 B1
(45) Date of Patent: Jan. 2, 2018

(54) METHODS AND APPARATUS FOR DETERMINING THE LOCATIONS OF COMPUTING DEVICES

(71) Applicant: Cisco Technology, Inc., San Jose, CA (US)

(72) Inventors: Pete Rai, Surrey (GB); Andre Jean-Marie Surcouf, St Leu la Foret (FR); Enzo Fenoglio, Issy-les-Moulineaux (FR); Joseph T. Friel, Ardmore, PA (US); Hugo Mike Latapie, Long Beach, CA (US); Toerless Tobias Eckert, Mountain View, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/194,062

(22) Filed: Jun. 27, 2016

(51) Int. Cl.
| | |
|---|---|
| *H04W 24/00* | (2009.01) |
| *H04W 4/02* | (2009.01) |
| *H04W 4/12* | (2009.01) |
| *H04L 29/08* | (2006.01) |
| *H04W 12/06* | (2009.01) |

(52) U.S. Cl.
CPC ............. *H04W 4/021* (2013.01); *H04L 67/22* (2013.01); *H04W 4/12* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 2007/0222588 A1* | 9/2007 | Wolfe | G08B 13/1427 340/539.13 |
| 2014/0159905 A1* | 6/2014 | Thompson | H04W 4/021 340/573.4 |
| 2017/0124853 A1* | 5/2017 | Mehta | G08B 25/016 |

* cited by examiner

*Primary Examiner* — Idowu O Osifade
(74) *Attorney, Agent, or Firm* — Ronald Fernando (57) ABSTRACT

In some implementations a method includes receiving a first message from a computing device via a first network. The first message may indicate that the computing device is unable to communicate with a second network. The method also includes determining whether a beacon operator has requested tracking of the computing device. The method further includes transmitting a second message to the beacon operator when the beacon operator has requested tracking of the computing device. The second message may include a first geographical location identified by the first network.

20 Claims, 7 Drawing Sheets

METHODS AND APPARATUS FOR DETERMINING THE LOCATIONS OF COMPUTING DEVICES

TECHNICAL FIELD

The present disclosure relates to tracking locations of computing devices. More specifically, the present disclosure relates to tracking computing devices that may move between networks.

BACKGROUND

Many users may be concerned with the location, safety, and/or security of various people and/or assets. For example, a user may be concerned about the safety and/or security of their children, parents (e.g., elderly), etc., and may want to track (e.g., monitor) the location of their children, parents, etc. The user may want to be notified when their children leave a location (e.g., leave their school, leave their home, etc.). Other users may want to monitor whether certain users leave a location. For example, a person may be under house arrest or probation and may not be allowed to leave the person's home, and the user may want to monitor the person to ensure that the person does not violate their house arrest/probation (e.g., does not leave the person's home). Another user may be concerned with the security of an asset (e.g., a physical item). For example, a business may be concerned with the security of a high-cost product sold by the business. The business may want to be notified when the asset is no longer in the vicinity of the business's location.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings show only some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, and methods for determining a location of a computing device. For example, in some implementations a method includes receiving a first message from a computing device via a first network. In various implementations, the first network is a primary or home network. The first message may indicate that the computing device is unable to communicate with a second network. The method includes determining whether a beacon operator has requested tracking of the computing device. The method includes transmitting a second message to the beacon operator when the beacon operator has requested tracking of the computing device. The second message may include a first geographical location identified by the first network. The method may include determining the first geographical location identified by the first network.

In some implementations, a method includes receiving a first message from a network operator. The first message may indicate that a computing device has been detected on a first network associated with the network operator. The method includes determining whether to request tracking of the computing device based on the first message. The method includes transmitting a second message to the network operator when tracking is requested. The second message may include a request to track the computing device.

In some implementations, an apparatus includes one or more processors and a memory comprising instructions that when executed cause the one or more processors to perform operations. The operations include receiving a first message from a computing device via a first network. The first message may indicate that the computing device is unable to communicate with a second network. The operations may include determining whether a beacon operator has requested tracking of the computing device. The operations may include transmitting a second message to the beacon operator when the beacon operator has requested tracking of the computing device. The second message may include a first geographical location identified by the first network.

Detailed Description

As discussed, many users may be concerned with the location, safety, and/or security of various people and/or assets. For example, a user may be want to be notified when various people leave one or more locations (e.g., when a child leaves home, when a person violates house arrest, etc.). In another example, a user may want to be notified when an asset (e.g., a high value or a high cost item) leaves a location (e.g., a geographical location). Tracking devices may be used to track the location of people and/or assets. A tracking device often includes hardware and/or software (e.g., a global positioning system (GPS) module) that may be used to determine the location of the tracking device. A GPS module may increase the cost of the tracking device and may increase the amount of power consumed/used by the tracking device.

Computing devices are now commonplace in various settings and/or environments. Because of the prevalence of computing devices, many locations use access points (e.g., wireless routers, hubs, etc.) to provide the computing devices with access to networks (e.g., with access to the internet) and/or to other computing devices (e.g., with access to a server computer). For example, a coffee shop may use an access point to provide customers with access to the Internet. In another example, a user may use an access point (e.g., a wireless router) in their home to provide the residents/guests of their home with access to the Internet.

In some embodiments, a system architecture may use one or more access points to track the location of people and/or assets. The system architecture may include a computing device that has a network interface (e.g., a network interface card, a wireless network card, etc.). The computing device may be a low power device that may not include hardware and/or software (e.g., may lack a GPS module) that may be used to determine the location (e.g., geographical location) of the computing device. The computing device may be associated with one or more networks (e.g., one or more wireless networks) located in one or more locations (e.g., a first network located in a home, a second network located in an elementary school, a third network located in an office, etc.). When the computing device is unable to communicate with and/or detect the one or more networks, the computing device may transmit and/or broadcast a message indicating that the computing device is unable to communicate with and/or detect the one or more networks. An access point module for a separate network may detect the message and may forward the message to a network operator module. The network operator module may forward the message to a beacon operator module to determine whether to track the location of the computing device. If the computing device is to be tracked, the network operator module may transmit the geographical location of the network and/or access point where the computing device was detected, to the beacon operator module.

Figure 1:
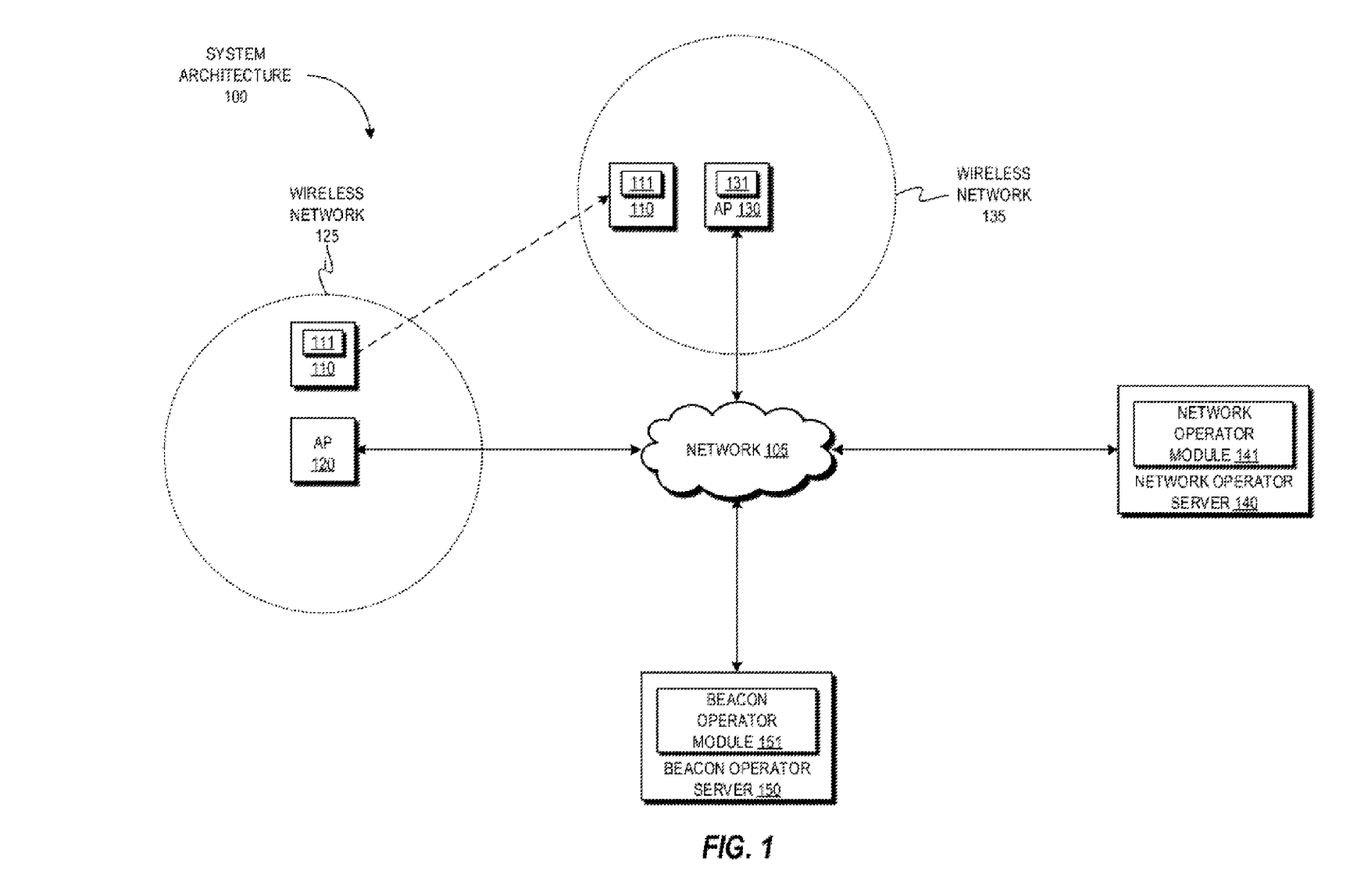
FIG. 1 is a block diagram illustrating a system architecture in accordance with some embodiments.

FIG. 1 is a block diagram illustrating a system architecture 100, in accordance with some embodiments. The system architecture 100 may include a network 105, a mobile computing device 110 (hereinafter, computing device 110), a first access point 120 (hereinafter, access point 120), a first wireless network 125 (hereinafter, network 125), a second access point 130 (hereinafter, access point 130), a second wireless network 135 (hereinafter, network 135), a network operator server 140 (hereinafter, server 140), and a beacon operator server 150 (hereinafter, server 150). The server 140 and the server 150 may include one or more computing devices. Examples of a computing device may include, but are not limited to, a rack-mount server, a router computer, a server computer, a personal computer, a mainframe computer, a smartphone, a personal digital assistant (PDA), a laptop computer, a tablet computer, a desktop computer, speakers, televisions (e.g., smart TVs), set top boxes (STB), etc.

In some implementations, the computing device 110 may be a low power computing device. In such implementations, the computing device 110 may not include hardware and/or software to determine the location of the computing device 110. In some examples, the computing device 110 may be a wearable computing device. For example, the computing device 110 may be a smart watch, a smart bracelet, a smart necklace, a clandestine or concealed device (e.g., a button), etc. The network 105 may include one or more of a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), and/or a combination thereof. The wireless networks 125 and 135 may be wireless networks including, but not limited to, Wi-Fi networks (e.g., 802.11 networks), Bluetooth networks, ZigBee networks, Z-Wave networks, LPWA (low-power wide-area) networks, etc.

The computing device 110 may include a device module 111. As discussed above, the computing device 110 may be associated with one or more networks (e.g., one or more wireless networks). The one or more networks may be referred to as home networks. For example, the network 125 may be referred to as the home network. The computing device 110 and/or the device module 111 may periodically determine whether the computing device 110 is able to detect the network 125 via the access point 120. For example, the computing device 110 and/or device module 111 may determine whether signals and/or messages transmitted by the access point 120 are detected at periodic intervals (e.g., minute intervals). In another example, the computing device 110 and/or device module 111 may periodically (e.g., at thirty second intervals) determine whether the computing device 110 is able to communicate with another computing device that is on the network 125. In some scenarios, the computing device 110 may be able to communicate with the network 125 (via the access point 120) when the computing device 110 is within a location associated with the network 125 and/or access point 120. For example, if the network 125 is located at the user's home, the computing device 110 may be able to communicate with the network 125 when the computing device 110 is located within or near the user's home.

As illustrated in FIG. 1, the computing device 110 may move away from the location associated with the network 125 (e.g., along the path illustrated by the dashed line). For example, a user holding and/or wearing the computing device 110 may move away from the user's home. In some implementations, the computing device 110 and/or the device module 111 may periodically transmit one or more beacon messages (not shown) when the computing device 110 is unable to communicate with one or more wireless networks. A beacon message may indicate that the computing device 110 is unable to communicate with one or more wireless networks. Moreover, a beacon message can specify the wireless networks with which the computing device 110 is unable to communicate with. For example, the computing device 110 and/or the device module 111 may periodically (e.g., at thirty second intervals) transmit (e.g., broadcast) a beacon message (e.g., a frame, a packet, other data) indicating that the computing device 110 is unable to communicate with the network 125.

As illustrated in FIG. 1, the computing device 110 may move into range of the network 135 provided by the access point 130. For example, the computing device 110 may move into a location associated with the network 135 and/or the access point 130. The access point 130 may be owned, maintained, and/or operated by a network operator. For example, the access point 130 may be operated by an entity (e.g., a business) that provides network access (internet access) at various locations (e.g., coffee shops, airports, etc.). The network 135 may be referred to as a non-home network, a roaming network, an external network, etc.

The access point 130 may include an access point module 131. The access point module 131 may detect the messages periodically transmitted by the computing device 110 when the computing device 110 is unable to communicate with the network 125 (e.g., may detect the beacon messages). In some implementations, the access point 130 and/or the access point module 131 may forward the messages (e.g., the beacon messages) to the server 140 via the network 105. The access point 130 and/or the access point module 131 may provide an identifier (e.g., a name, an alphanumeric string, etc.) for the access point 130 to the server 140. Server 140 may determine the location (e.g., geographical location) of the access point 130 and/or the network 135 based on the identifier. Alternatively or additionally, access point 130 and/or the access point module 131 may provide the location of the access point 130 and/or the network 135 to the server 140.

The server 140 may be associated with the network operator for the access point 130 and/or the network 135. As illustrated in FIG. 1, the server 140 may include a network operator module 141. In some implementations, the network operator module 141 may receive the beacon messages (e.g., the messages transmitted by the computing device 110 when the computing device 110 is unable to communicate with the home network 125) forwarded by the access point 130. As discussed above, the beacon messages may indicate (or may include data that indicates) that the computing device is unable to communicate with the network 125. The beacon messages may indicate that the computing device 110 is no longer at or near a location associated with the network 125 (e.g., is no longer in the user's home). The beacon messages may include one or more identifiers for the computing device 110 (e.g., a name for the computing device 110, a serial number for the computing device 110, a media access control (MAC) address for the computing device 110, etc.), and/or identifiers for a user of the computing device 110 (e.g., the user's email address, the user's legal name, the user's login name, etc.).

In some implementations, the server 140 and/or the network operator module 141 may determine whether a beacon operator (discussed in more detail below) has requested tracking of the computing device 110. For example, the network operator module 141 and/or the server 140 may transmit a message that includes the identifier for the computing device 110 and/or the user to the server 150 (which may be associated with a beacon operator, as discussed in more detail below). The server 140 and/or network operator module 141 may receive a request to track the computing device 110 from the server 150, based on the message that includes the identifiers for the computing device 110 and/or the user. For example, the server 140 and/or network operator module 141 may receive a message from the server 150. The message may include a request for the location of the access point 130 (that detected the beacon message of the computing device 110) and/or the network 135.

In some implementations, the server 140 and/or the network operator module 141 may identify the beacon operator based on the beacon messages received from the computing device 110. For example, the system architecture 100 may include multiple servers each associated with a different beacon operator. Each beacon operator may be a service provider that provides a tracking service to track different set of computing devices. The beacon messages transmitted by the computing device 110 may include data that may be used to identify a beacon operator from a plurality of beacon operators. For example, the beacon messages may include a name or an address for a beacon operator. The server 140 and/or the network operator module 141 may identify the server associated with the identified beacon operator.

In some implementations, the network operator module 141 may instruct the access point 130 and/or the access point module 131 to authenticate the computing device 110. For example, the network operator module 141 may instruct the access point 130 and/or the access point module 131 to transmit an authentication request to the computing device 110 (e.g., may instruct the access point 130 to transmit a nonce, a password request, etc., to the computing device 110). In one embodiment, the authentication request may be provided by the server 150 and/or the beacon operator module 151. In another embodiment, the authentication request may be determined based on a protocol (e.g., a security protocol, an authentication protocol, etc.) that may be standardized between computing device 110, the access point 130, the server 140, and/or the server 150. In another embodiment, the access point 130 and/or the access point module 131 may transmit multiple authentication requests to the computing device 110 and may receive multiple authentication replies from the computing device 110. For example, the access point 130 and/or the access point module 131 may transmit a first authentication request provided by the server 140 and may transmit a second authentication request provided by the server 150. In some implementations, the responsibility for authentication is provided to the beacon operator, and the network operator is prevented from independently verifying identity. In some implementations, a network operator is enabled with permissions to independently verify identity.

The computing device 110 may transmit an authentication reply (or multiple authentication replies) to the access point 130 based on the authentication request. For example, the computing device 110 may transmit a reply-nonce, a password, etc., to the access point 130. The access point 130 and/or the access point module 131 may determine whether the authentication reply (or multiple authentication replies) is valid. In some implementations, the access point 130 may transmit the authentication reply (or multiple authentication replies) to the server 140 and/or the server 150 for validation. When the authentication reply (or multiple authentication replies) is valid, the server 140 and/or network operator module 141 may transmit a second message (that includes the geographical location of the access point 130 and/or the network 135) to the server 150. For example, the server 140 and/or network operator module 141 may transmit a second message including the street address of a building where the access point 130 is located, GPS coordinates of the access point 130, etc.

In some implementations, the server 140 and/or the network operator module 141 may transmit a second message to the server 150 when the authentication reply (or multiple authentication replies) is valid. The server 140 and/or network operator module 141 may also transmit the authentication reply (or multiple authentication replies) to the server 150. For example, the server 140 and/or network operator module 141 may include the authentication reply in the second message or may transmit the authentication reply in a separate message. In another embodiment, the server 140 and/or the network operator module 141 may refrain from transmitting the second message when the authentication reply is not valid. For example, the server 140 and/or the network operator module 141 may not transmit the second message (that includes the geographical location of the access point 130 and/or the network 135) when the authentication reply is not valid.

In some implementations, the server 140 and/or the network operator module 141 may determine that a beacon operator (discussed in more detail below) has not requested tracking of the computing device 110. The server 140 and/or the network operator module 141 may refrain from transmitting the second message when the beacon operator has not requested tracking of the computing device. For example, the server 140 and/or the network operator module 141 may not transmit the second message (that includes the geographical location of the access point 130 and/or the network 135) when the server 150 transmits a message to the server 140 and/or the network operator module 141 indicating that the beacon operator does not request the location of the computing device 110. In some implementations, the access point 130 and/or the access point module 131 may determine not to transmit the authentication request to the computing device 110 when the beacon operator has not requested tracking of the computing device 110. For example, the server 140 and/or the network operator module 141 may not instruct the access point 130 and/or the access point module 131 to authenticate the computing device 110 when the beacon operator has not requested tracking of the computing device 110.

The server 150 may be associated with a beacon operator that may determine to track the computing device 110 (e.g., may determine to receive the location of the computing device 110 when the computing device 110 leaves a location associated with the access point 120 and/or the network 125). As illustrated in FIG. 1, the server 150 includes a beacon operator module 151. In some examples, the beacon operator module 151 may receive a first message from the server 140 indicating that the computing device 110 has been detected on a network associated with the network operator (e.g., indicating that the computing device has been detected on the network 135). As discussed above, the message may include one or more identifiers for the computing device 110 and/or the user of the computing device 110.

In some implementations, the server 150 and/or the beacon operator module 151 may determine whether to request tracking of the computing device 110. For example, the server 150 and/or the beacon operator module 151 may analyze the one or more identifiers received from the server 140. The server 150 and/or the beacon operator module 151 may determine whether account information associated with the one or more identifiers indicates that tracking of the computing device 110 is desired. In another example, the server 150 and/or the beacon operator module 151 may transmit a message to another computing device (e.g., another server, another computing device of another user) to determine whether tracking of the computing device 110 is desired.

In some implementations, the server 150 and/or the beacon operator module 151 may transmit a second message to the server 140 when the server 150 and/or the beacon operator module 151 determine to request tracking of the computing device 110. For example, the server 150 and/or the beacon operator module 151 may transmit the second message to the server 140 indicating that the server 150 and/or the beacon operator module 151 is requesting the location of the network 135 that detected the computing device 110.

In some implementations, the server 150 and/or the beacon operator module 151 may transmit an authentication request to the server 140. The server 140 may transmit the authentication request to the computing device 110 via the access point 130, as discussed above). The server 150 and/or the beacon operator module 151 may transmit the authentication request in the same message that requests the tracking of the computing device 110. Alternatively, the server 150 and/or the beacon operator module 151 may transmit the authentication request in a separate message, as discussed above.

In some implementations, the server 150 and/or the beacon operator module 151 may receive a third message from the server 140. The third message may include a geographical location of the access point 130 and/or the network 135 where the computing device 110 was detected. In various implementations, transmission of a geographical location may be proceeded by a financial transaction between a beacon operator (or network operator) and a network operator (or an access point). In various implementations, the third message may include GPS coordinates, a street address, a longitude/latitude, etc. In some scenarios, the third message may include one or more authentication replies from the computing device 110. Alternatively, the one or more authentication replies may be transmitted to the server 150 using separate messages, as discussed above.

In some implementations, the server 150 and/or the beacon operator module 151 may determine whether the one or more authentication replies are valid. If the one or more authentication replies are valid, the server 150 and/or the beacon operator module 151 may transmit messages include the geographical location of the access point 130 and/or the network 135 to another computing device. For example, the server 150 and/or the beacon operator module 151 may transmit a message (e.g., a text message, a chat message, an email, etc.) to another computing device that may be associated with a parent of the user of the computing device 110. In another example, the server 150 and/or the beacon operator module 151 may transmit a message to first responder personnel (e.g., paramedics, firefighters, police, etc.). If the one or more authentication replies are not valid, the server 150 and/or the beacon operator module 151 may determine not to transmit messages including the geographical location of the access point 130 and/or the network 135 to one or more of the other computing device and/or personnel associated with the user of the computing device 110.

In some implementations, the server 150 and/or the beacon operator module 151 may determine not to transmit the second message (requesting tracking of the computing device 110) to the server 140 when the server 150 and/or the beacon operator module 151 determines not to request tracking of the computing device 110. For example, the server 150 and/or the beacon operator module 151 may transmit a message to the server 140 indicating that the server 150 and/or the beacon operator module 151 is not requesting the location of the network 135 that detected the computing device 110.

It shall be understood that in other embodiments, different numbers of computing devices, access points, networks, network operators, beacon operators, and/or computing devices may be included in the system architecture 100. For example, the system architecture 100 may include ten network operators each associated with a different access point and a different server. In another example, the system architecture may include six beacon operators, each beacon operator may be associated with a different server and may track a different set of computing devices.

Figure 2:
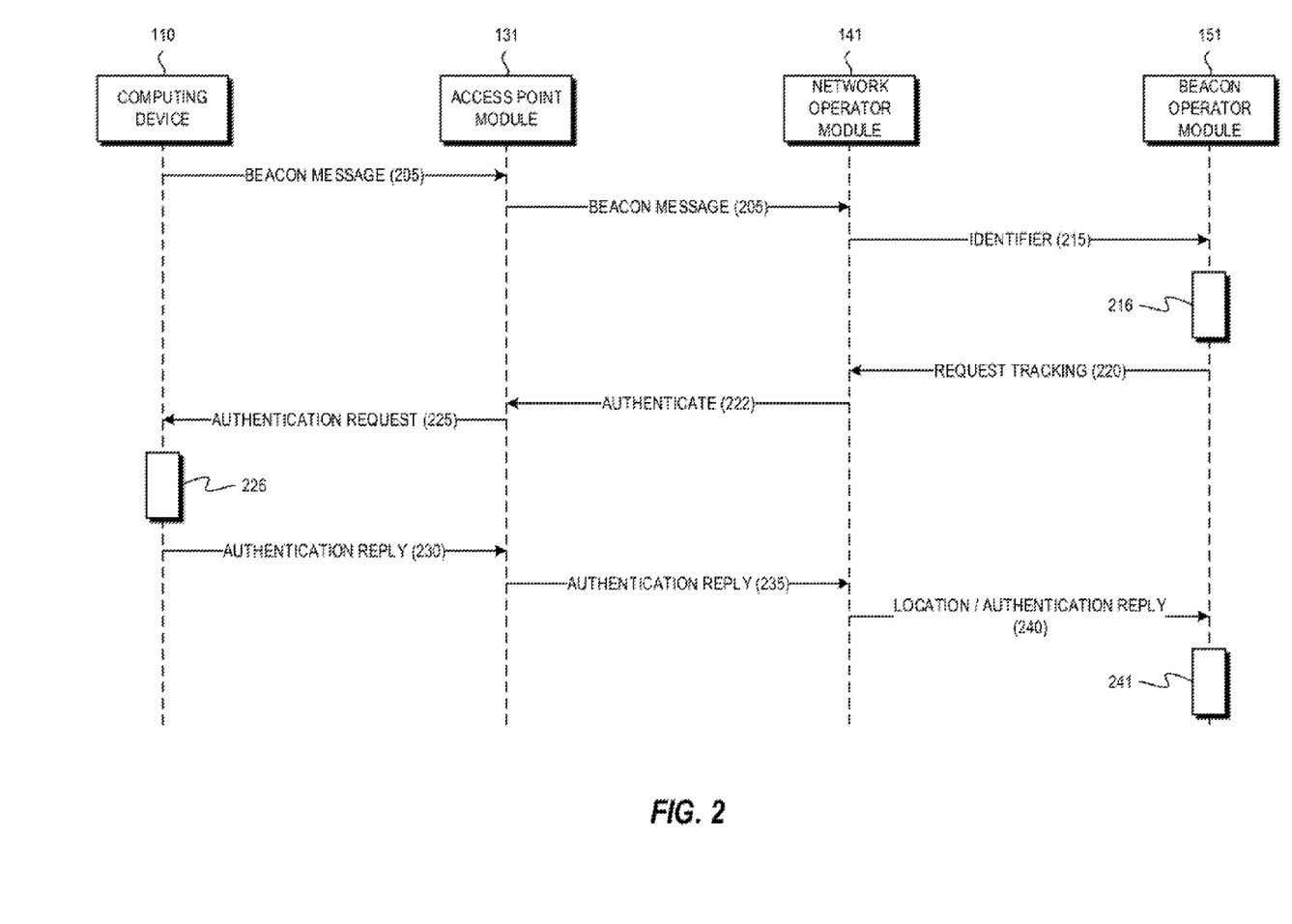
FIG. 2 is a timing diagram illustrating an example message flow for tracking a computing device in accordance with some embodiments.

FIG. 2 is a sequence diagram illustrating an example message flow for tracking a computing device, in accordance with some embodiments. The message flow includes messages that are transmitted between the computing device 110, the access point module 131 (of the access point 130), the network operator module 141 (of the server 140), and the beacon operator module (of the server 150) illustrated in FIG. 1. As discussed above, the computing device 110 may determine that the computing device 110 is unable to communicate with a home network (e.g., network 125 illustrated in FIG. 1). The computing device 110 may broadcast one or more beacon messages 205. The access point module 131 may detect the beacon messages 205 and may forward the beacon messages 205 to the network operation module 141. The network operator module 141 may determine one or more identifiers based on the beacon messages 205 (e.g., an identifier of the computing device, an identifier of a user associated with the computing device 110, etc.), as discussed above. In one embodiment, the access point module 131 may determine the one or more identifiers (based on the beacon messages) and may transmit the one or more identifiers to the network operator module 141.

The network operator module 141 may transmit a message 215 to the beacon operator module 151 to determine whether tracking of the computing device has been requested by the beacon operator. For example, the network operator module 141 may transmit a message that includes the one or more identifiers, as discussed above. The beacon operator module 151 may analyze the one or more identifiers at block 216. For example, the beacon operator module 151 may determine whether to request tracking of the computing device 110 based on account information associated with the one or more identifiers indicates (e.g., as discussed above). If tracking of the computing device 110 is desired, the beacon operator module 151 may transmit a message 220 requesting that the network operator module 141 provide the geographical location of the access point and/or network where the computing device was detected (e.g., the geographical location of the access point 130 and/or the network 135).

The network operator module 141 may transmit a message 222 to the access point module 131. The message 222 may instruct the access point module 131 to authenticate the computing device 110. In some examples, the message 222 may include an authentication request (e.g., a nonce) provided by the network operator module 141 and/or the beacon operator module 151, as discussed above. In some examples, the access point module 131 may determine the authentication request based on a protocol that is standardized between the computing device 110, the access point module 131, the network operator module 141, and/or the beacon operator module 151, as discussed above. The access point module 131 may transmit a message 225 that includes the authentication request to the computing device 110.

The computing device 110 may receive the authentication request and may generate an authentication reply (e.g., a reply-nonce) at block 226. The computing device 110 may transmit a message 230 that includes the authentication reply to the access point module 131. In some implementations, the access point module 131 may transmit multiple authentication requests. In such implementations, the computing device 110 may generate and transmit multiple authentication replies, as discussed above. The access point module 131 may forward the authentication reply to the network operator module 141 for validation in message 235. In some examples, the network operator module 141 may validate the authentication reply and may transmit the results of the validation (e.g., valid, invalid) to the beacon operator module 151. If the authentication reply is valid, the network operator module 141 may transmit a message 240 to the beacon operator module 151. The message 240 may include the location of the access point and/or network where the computing device 110 was detected and/or may include the authentication reply. The beacon operator module 151 may transmit messages that include the geographical location of the access point and/or the network where the computing device 110 was detected to one or more of another computing device or personnel associated with a user of the computing device 110 at block 241, as discussed above.

Figure 3:
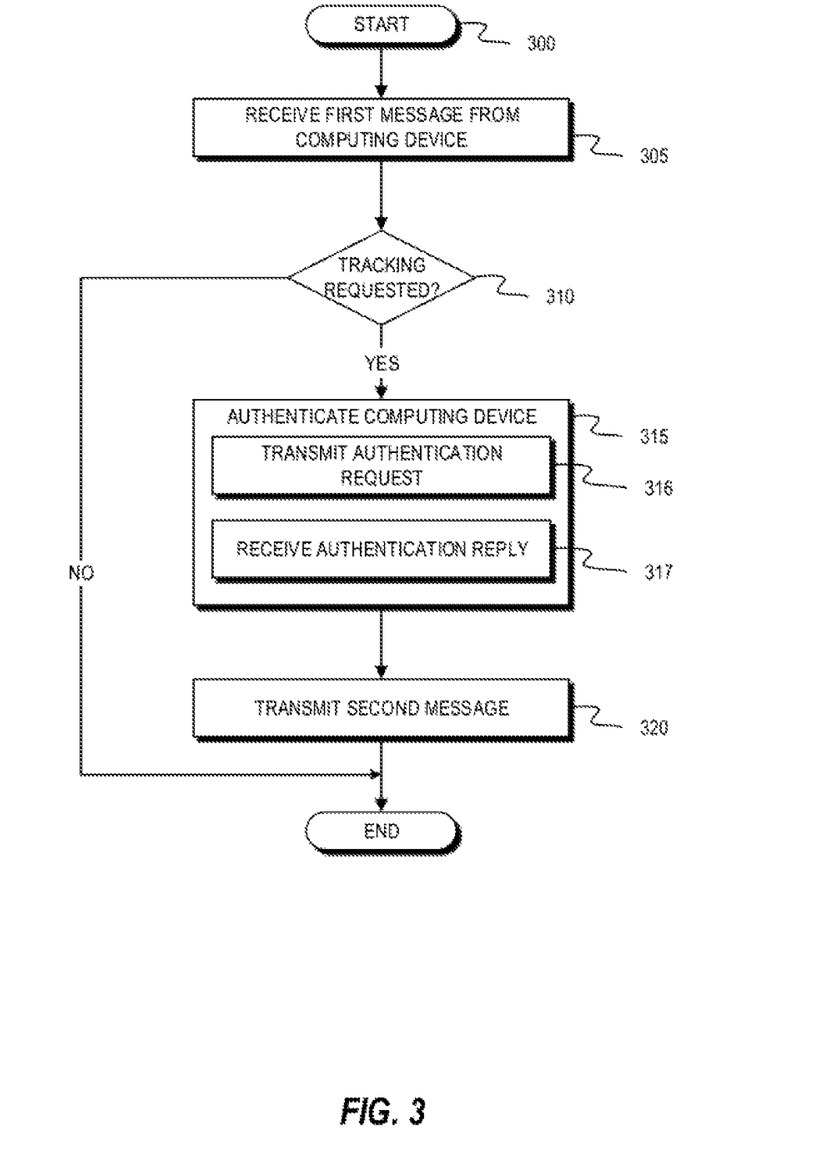
FIG. 3 is a flowchart representation of a method of tracking a computing device in accordance with some embodiments.

FIG. 3 is a flowchart representation of a method 300 of tracking a computing device, in accordance with some embodiments. In some implementations, the method 300 may be performed by an access point module and/or server (e.g., network operator module 141 and/or server 140 illustrated in FIG. 1). The access point module and/or server may include hardware (e.g., circuitry, dedicated logic, programmable logic, microcode, etc.), software (e.g., instructions executable on a processor to perform hardware simulation), firmware, or a combination thereof. Briefly, method 300 may include receiving a first message, determining whether tracking of the computing device has been requested, authenticating the computing device, and transmitting a second message. The method 300 begins at block 305 where the method 300 includes receiving a first message from the computing device. The first message may be a beacon message indicating that the computing device is unable to communicate with one or more home networks, as discussed above.

At block 310, the method 300 includes determining whether tracking of the computing device has been requested. For example, the method 300 may determine one or more identifiers based on the first message (e.g., determine a serial number of the computing device based on the beacon message). The method 300 may transmit the one or more identifiers to a beacon operator module, as discussed above. The beacon operator module may transmit a message indicating whether tracking of the computing device has or has not been requested. If tracking of the computing device has not been requested (e.g., a message indicating that the computing device is not to be tracked is received from the beacon operator module), and the method 300 ends.

If tracking of the computing device has been requested (e.g., a message indicating that the computing device is to be tracked is received from the beacon operator module). The method 300 includes authenticating the computing device at block 315. Authenticating the computing device may include transmitting an authentication request to the computing device at block 316 and receiving an authentication reply at block 317. In some examples, transmitting the authentication request at block 316 may include transmitting multiple authentication requests to the computing device. In such examples, receiving the authentication reply at block 317 may include receiving multiple authentication replies from the computing device.

Authenticating the computing device at block 315 may include generating the authentication request, or receiving the authentication request from a network operator and/or a beacon operator. The method 300 may include validating the authentication reply. For example, the method 300 may include directly validating the authentication reply. Alternatively, the method 300 may include transmitting the authentication reply to a beacon operator for validation, as discussed above. At block 320, the method 300 includes transmitting a second message to the beacon operator. The second message may include the geographical location of the access point and/or network where the computing device was detected, as discussed above. The second message may include the authentication reply, as discussed above.

The method 300 may include determining the geographical location of the access point and/or the network where the computing device was detected. Determining the geographical location of the access point and/or the network may include querying a lookup table or an index that stores the geographical locations of various access points and/or networks. The method may include generating the second message. Generating the second message may include instantiating a data container that may be utilized to communicate the geographical location of the access point and/or the network.

Figure 4:
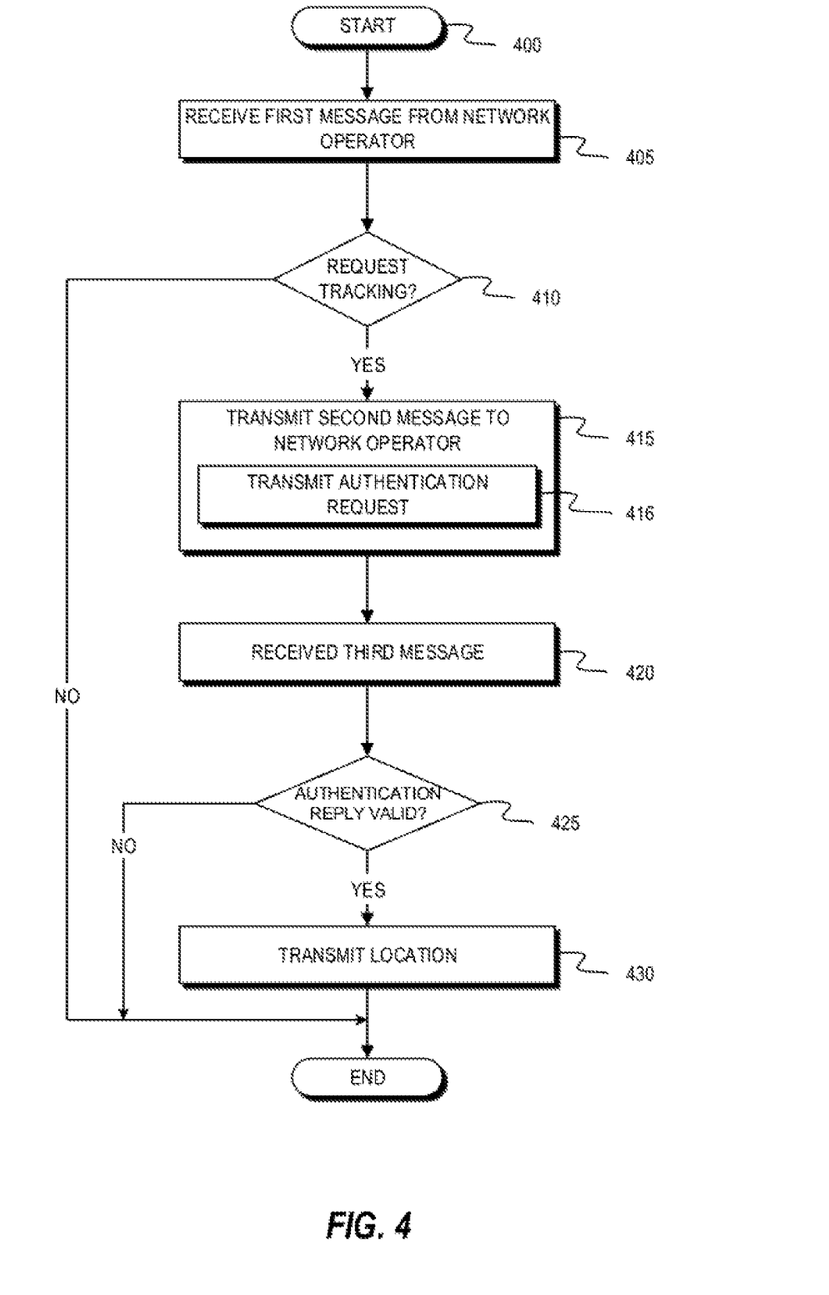
FIG. 4 is a flowchart representation of a method of tracking a computing device in accordance with some embodiments.

FIG. 4 is a flowchart representation of a method 400 of tracking a computing device, in accordance with some embodiments. In some implementations, the method 400 may be performed by a beacon operator module and/or a server (e.g., beacon operator module 151 and/or server 150 illustrated in FIG. 1). The beacon operator module and/or the server may include hardware (e.g., circuitry, dedicated logic, programmable logic, microcode, etc.), software (e.g., instructions run on a processor to perform hardware simulation), firmware, or a combination thereof. Briefly, method 400 may include receiving a message, determining whether to track the computing device, transmitting a request to track the computing device, and receiving the location of the computing device. The method 400 begins at block 405 where the method 400 includes receiving a first message from a network operator and/or a network operator module. As discussed above, the first message may include one or more identifiers of a computing device that was detected on a non-home network.

At block 410, the method 400 includes determining whether to request tracking of the computing device based on the one or more identifiers. For example, the method 400 may access account information to determine whether to request tracking of the computing device, as discussed above. If tracking of the computing device is not being requested, the method 400 ends. If tracking is being requested, the method includes transmitting a second message to the network operator and/or network operator module to request tracking of the computing device at block 415. Transmitting the second message may include transmitting an authentication request to the network operator at block 416. The authentication request may be included in the second message or may be transmitted in a separate message, as discussed above. Transmitting the second message at block 415 may include generating a request to track the computing device. Transmitting the second message at block 415 may also include generating (e.g., instantiating) a data container that represents the second message. Generating the second message may include writing the request to the data container.

The method 400 includes receiving a third message at block 420. The third message may include the geographical location of the access point and/or network where the computing device was detected (e.g., the geographical location of the non-home network). At block 425, the method 400 includes determining whether the authentication reply is valid, as discussed above. If the authentication reply is not valid, the method 400 ends. If the authentication reply is valid, the method 400 includes transmitting the geographical location of the access point and/or the network where the computing device was detected to one or more of another computing device or personnel associated with a user of the computing device 110 at block 430, as discussed above.

Figure 5:
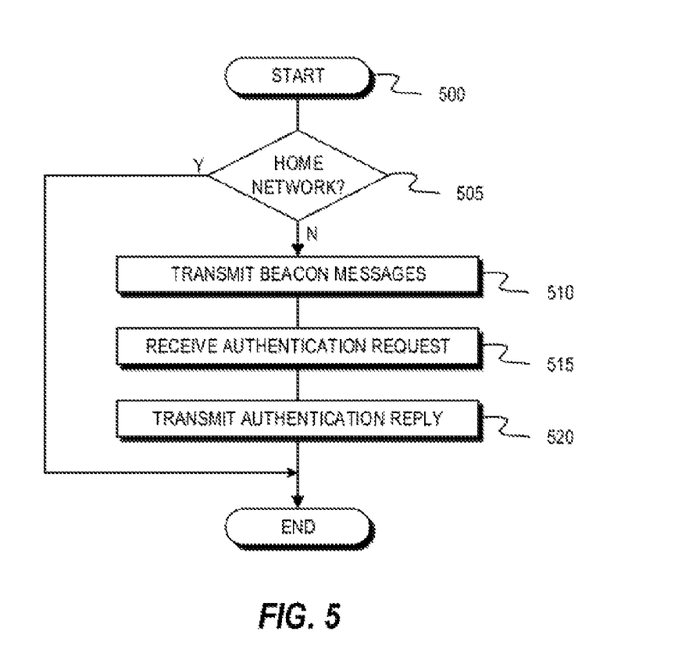
FIG. 5 is a flowchart representation of a method of tracking a computing device in accordance with some embodiments.

FIG. 5 is a flowchart representation of a method 500 of tracking a computing device, in accordance with some embodiments. In some implementations, the method 500 may be performed by a device module and/or computing device (e.g., device module 111 and/or computing device 110 illustrated in FIG. 1). The device module and/or computing device may include hardware (e.g., circuitry, dedicated logic, programmable logic, microcode, etc.), software (e.g., instructions run on a processor to perform hardware simulation), firmware, or a combination thereof. Briefly, method 500 may include determining whether a home network is detected and transmitting beacon messages. The method 500 begins at block 505 where the method 500 includes determining whether one or more home networks are detected. For example, the method 500 may determine whether the computing device is able to communicate with an access point of the home network, as discussed above. If the home network is detected, the method 500 ends.

If the home network is not detected, the method 500 includes transmitting one or more beacon messages at block 510. The beacon messages may be periodically transmitted (e.g., transmitted once every thirty seconds), as discussed above. At block 515, the method 500 includes receiving an authentication request (e.g., receiving a nonce) from an access point of a non-home network. The method 500 includes transmitting an authentication reply (e.g., a reply-nonce) to the access point of the non-home network at block 520. The authentication reply may also be generated at block 520.

Figure 6:
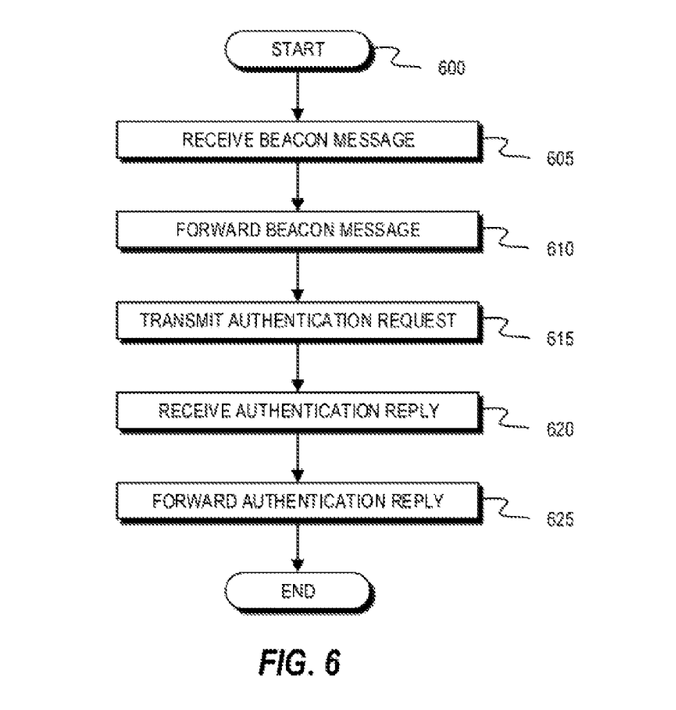
FIG. 6 is a flowchart representation of a method of tracking a computing device in accordance with some embodiments

FIG. 6 is a flowchart representation of a method 600 of tracking a computing device, in accordance with some embodiments. In some implementations, the method 600 may be performed by an access point module and/or an access point (e.g., access point module 131 and/or access point 130 illustrated in FIG. 1). The access point module and/or access point may include hardware (e.g., circuitry, dedicated logic, programmable logic, microcode, etc.), software (e.g., instructions run on a processor to perform hardware simulation), firmware, or a combination thereof. Briefly, method 600 may include receiving a beacon message, forwarding a beacon message, and authenticating the computing device. The method 600 begins at block 605 where the method 600 includes receiving a beacon message transmitted by a computing device. The beacon message may indicate that the computing device is unable to communicate with a home network.

At block 610, the method 600 includes transmitting and/or forwarding the beacon message to a beacon service operator, as discussed above. The method 600 includes transmitting an authentication request to the computing device at block 615. The method 600 may also generate the authentication request and/or receive the authentication request from a server at block 615, as discussed above. The method 600 includes receiving the authentication reply from the computing device at block 620. At block 625, the method 600 includes forwarding the authentication reply. In some examples, the method 600 may include validating the authentication reply and transmitting a message indicating whether the authentication reply is valid at block 625, as discussed above.

Figure 7:
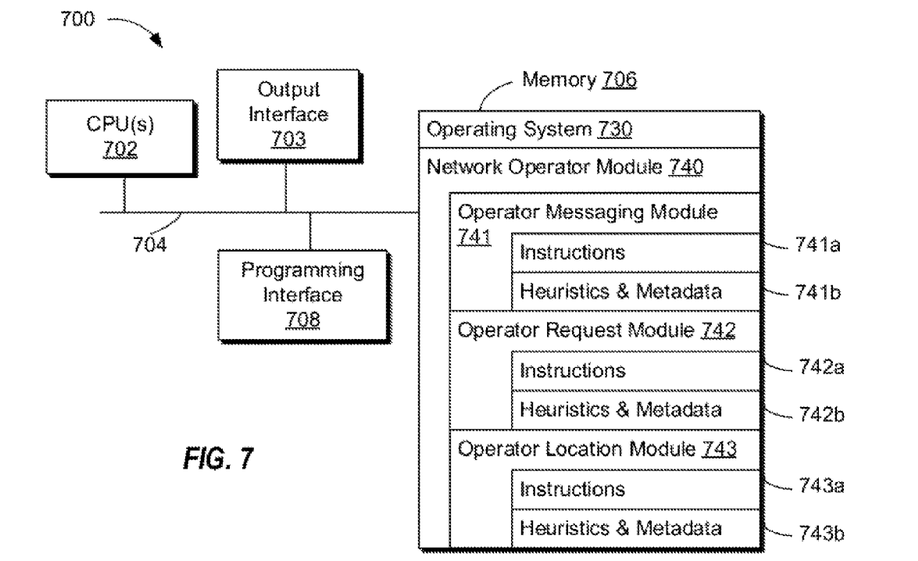
FIG. 7 is a block diagram of a computing device in accordance with some embodiments.

FIG. 7 is a block diagram of a computing device 700, in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 700 includes one or more processing units (CPU's) 702 (e.g., processors), one or more output interfaces 703, a memory 706, a programming interface 708, and one or more communication buses 704 for interconnecting these and various other components.

In some embodiments, the communication buses 704 include circuitry that interconnects and controls communications between system components. The memory 706 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706 comprises a non-transitory computer readable storage medium. Moreover, in some embodiments, the memory 706 or the non-transitory computer readable storage medium of the memory 706 stores the following programs, modules and data structures, or a subset thereof including an optional operating system 730 and a network operator module 740. In some embodiment, one or more instructions are included in a combination of logic and non-transitory memory. The operating system 730 includes procedures for handling various basic system services and for performing hardware dependent tasks. In some embodiments, the network operator module 740 may be configured to receive messages (e.g., beacon messages), determine whether tracking of a separate computing device has been requested, authenticate the separate computing device, and transmit a message including the location of the separate computing device. The network operator module 740 may also perform various functions, operations, methods, and/or tasks, as discussed above. To that end, the network operator module 740 includes an operator messaging module 741, an operator request module 742, and an operator location module 743.

In some embodiments, the operator messaging module 741 may receive and/or detect messages, such as beacon messages. To that end, the operator messaging module 741 includes a set of instructions 741a and heuristics and metadata 741b. In some embodiments, the operator request module 742 may determine whether a beacon operator wants to track the separate computing device. To that end, the operator request module 742 includes a set of instructions 742a and heuristics and metadata 742b. In some embodiments, the operator location module 743 may transmit the location of the network and/or access point where the separate computing device was detected, to a beacon operator. To that end, the operator location module 743 includes a set of instructions 743a and heuristics and metadata 743b.

Although the network operator module 740, the operator messaging module 741, the operator request module 742, and the operator location module 743 are illustrated as residing on a single computing device 700, it should be understood that in other embodiments, any combination of the network operator module 740, the operator messaging module 741, the operator request module 742, and the operator location module 743 may reside on separate computing devices.

Figure 8:
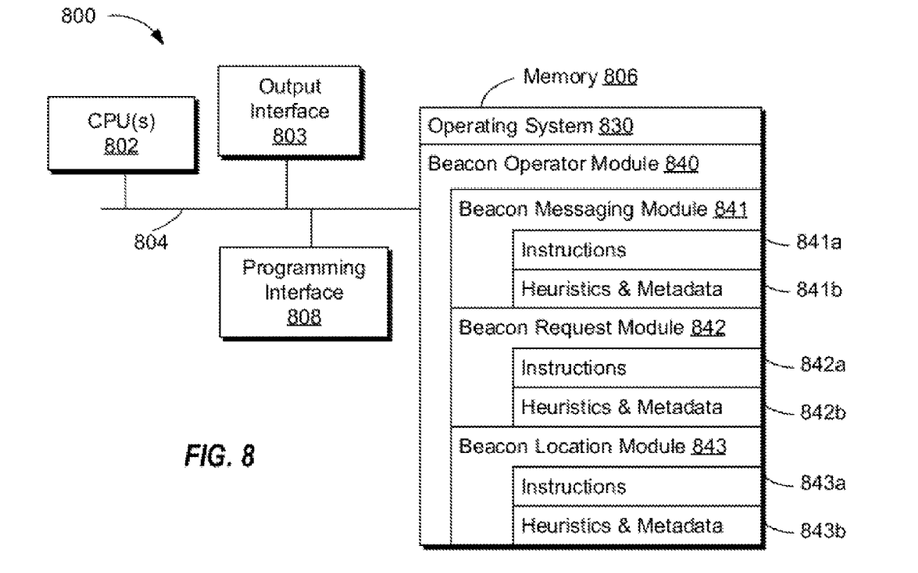
FIG. 8 is a block diagram of a computing device in accordance with some embodiments.

FIG. 8 is a block diagram of a computing device 800, in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 800 includes one or more processing units (CPU's) 802 (e.g., processors), one or more output interfaces 803, a memory 806, a programming interface 808, and one or more communication buses 804 for interconnecting these and various other components.

In some embodiments, the communication buses 804 include circuitry that interconnects and controls communications between system components. The memory 806 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 806 optionally includes one or more storage devices remotely located from the CPU(s) 802. The memory 806 comprises a non-transitory computer readable storage medium. Moreover, in some embodiments, the memory 806 or the non-transitory computer readable storage medium of the memory 806 stores the following programs, modules and data structures, or a subset thereof including an optional operating system 830 and a beacon operator module 840. In some embodiment, one or more instructions are included in a combination of logic and non-transitory memory. The operating system 830 includes procedures for handling various basic system services and for performing hardware dependent tasks. In some embodiments, the beacon operator module 840 may be configured to receive a message from a network operator that identifies a separate computing device, determine whether to request tracking of the separate computing device, transmit an authentication request, receive the location of the separate computing device, receive an authentication reply, and transmit the location of the separate computing device. The beacon operator module 840 may also perform various functions, operations, methods, and/or tasks, as discussed above. To that end, the beacon operator module 840 includes a beacon messaging module 841, a beacon request module 842, and a beacon location module 843.

In some embodiments, the beacon messaging module 841 may receive messages from a network operator identifying the separate computing device. To that end, the beacon messaging module 841 includes a set of instructions 841a and heuristics and metadata 841b. In some embodiments, the beacon request module 842 determines whether it is desirable to track the separate computing device. To that end, the beacon request module 842 includes a set of instructions 842a and heuristics and metadata 842b. In some embodiments, the beacon location module 843 may determine whether an authentication reply is valid and may transmit the location of the separate computing device to personnel and/or other computing devices. To that end, the beacon location module 843 includes a set of instructions 843a and heuristics and metadata 843b.

Although the beacon operator module 840, the beacon messaging module 841, the beacon request module 842, and the beacon location module 843 are illustrated as residing on a single computing device 800, it should be understood that in other embodiments, any combination of the beacon operator module 840, the beacon messaging module 841, the beacon request module 842, and the beacon location module 843 may reside on separate computing devices.

Figure 9:
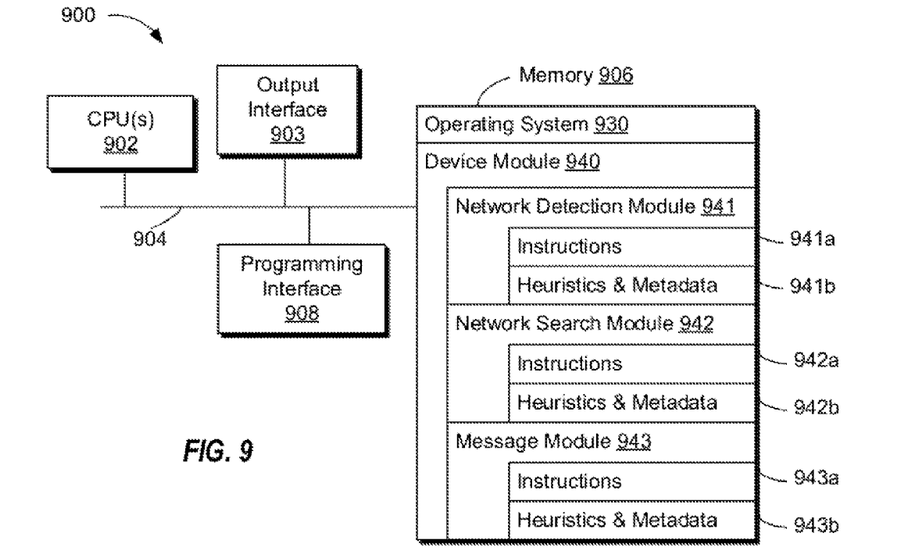
FIG. 9 is a block diagram of a computing device in accordance with some embodiments.

FIG. 9 is a block diagram of a computing device 900, in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 900 includes one or more processing units (CPU's) 902 (e.g., processors), one or more output interfaces 903, a memory 906, a programming interface 908, and one or more communication buses 904 for interconnecting these and various other components.

In some embodiments, the communication buses 904 include circuitry that interconnects and controls communications between system components. The memory 906 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 906 optionally includes one or more storage devices remotely located from the CPU(s) 902. The memory 906 comprises a non-transitory computer readable storage medium. Moreover, in some embodiments, the memory 906 or the non-transitory computer readable storage medium of the memory 906 stores the following programs, modules and data structures, or a subset thereof including an optional operating system 930 and a device module 940. In some embodiment, one or more instructions are included in a combination of logic and non-transitory memory. The operating system 930 includes procedures for handling various basic system services and for performing hardware dependent tasks. In some embodiments, the device module 940 may be configured to determine whether a home network is detected, transmit beacon messages, receive authentication request, and transmit authentication replies. The device module 940 may also perform various functions, operations, methods, and/or tasks, as discussed above. To that end, the device module 940 includes a network detection module 941, a network search module 942, and a message module 943.

In some embodiments, the network detection module 941 may determine whether a home network is detected. To that end, the network detection module 941 includes a set of instructions 941a and heuristics and metadata 941b. In some embodiments, the network search module 942 may periodically transmit beacon messages. To that end, the network search module 942 includes a set of instructions 942a and heuristics and metadata 942b. In some embodiments, the message module 943 may receive authentication requests, generate authentication replies, and transmit authentication replies. To that end, the message module 943 includes a set of instructions 943a and heuristics and metadata 943b.

Although the device module 940, the network detection module 941, the network search module 942, and the message module 943 are illustrated as residing on a single computing device 900, it should be understood that in other embodiments, any combination of device module 940, the network detection module 941, the network search module 942, and the message module 943 may reside on separate computing devices.

Figure 10:
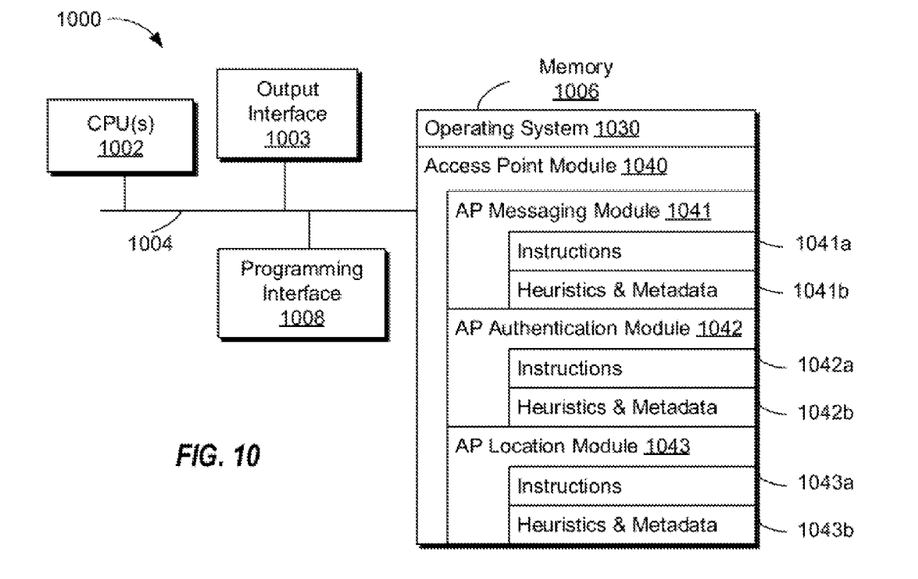
FIG. 10 is a block diagram of a computing device in accordance with some embodiments.

FIG. 10 is a block diagram of a computing device 1000, in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 1000 includes one or more processing units (CPU's) 1002 (e.g., processors), one or more output interfaces 1003, a memory 1006, a programming interface 1008, and one or more communication buses 1004 for interconnecting these and various other components.

In some embodiments, the communication buses 1004 include circuitry that interconnects and controls communications between system components. The memory 1006 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1006 optionally includes one or more storage devices remotely located from the CPU(s) 1002. The memory 1006 comprises a non-transitory computer readable storage medium. Moreover, in some embodiments, the memory 1006 or the non-transitory computer readable storage medium of the memory 1006 stores the following programs, modules and data structures, or a subset thereof including an optional operating system 1030 and an access point module 1040. In some embodiment, one or more instructions are included in a combination of logic and non-transitory memory. The operating system 1030 includes procedures for handling various basic system services and for performing hardware dependent tasks. In some embodiments, the access point module 1040 may be configured to receive beacon messages, forward beacon messages, transmit authentication requests, receive authentication replies, validate authentication replies, forward authentication replies, and transmit a location and/or identifier for an access point. The access point module 1040 may also perform various functions, operations, methods, and/or tasks, as discussed above. To that end, the access point module 1040 includes an AP messaging module 1041, an AP authentication module 1042, and an AP location module 1043.

In some embodiments, the AP messaging module 1041 may receive beacon messages and may forward beacon messages. To that end, the AP messaging module 1041 includes a set of instructions 1041a and heuristics and metadata 1041b. In some embodiments, the AP authentication module 1042 receives authentication replies, validates authentication replies, and forwards authentication replies. To that end, the AP authentication module 1042 includes a set of instructions 1042a and heuristics and metadata 1042b. In some embodiments, the AP location module 1043 may transmit a location and/or identifier for an access point. To that end, the AP location module 1043 includes a set of instructions 1043a and heuristics and metadata 1043b.

Although the access point module 1040, the AP messaging module 1041, the AP authentication module 1042, and the AP location module 1043 are illustrated as residing on a single computing device 1000, it should be understood that in other embodiments, any combination of the access point module 1040, the AP messaging module 1041, the AP authentication module 1042, and the AP location module 1043 may reside on separate computing devices.

Moreover, FIGS. 7 through 10 are intended more as functional description of the various features which may be present in a particular embodiment as opposed to a structural schematic of the embodiments described herein. As recognized by those of ordinary skill in the art, items shown separately could be combined and some items could be separated. For example, some functional modules shown separately in FIGS. 7 through 10 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged, certain steps and/or phases may be repeated, and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements.

Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

It will also be understood that, although the terms "first," "second," etc. may be used herein to describe various elements, these elements should not be limited by these terms. These terms are only used to distinguish one element from another. For example, a first message could be termed a second message, and, similarly, a second message could be termed a first message, which changing the meaning of the description, so long as all occurrences of the "first message" are renamed consistently and all occurrences of the "second message" are renamed consistently. The first message and the second message are both messages, but they are not the same message. Also as used in the description of the embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items.

Further as used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the disclosure provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
   receiving a first message from a computing device via a first access point of a first network, the first message indicating that the computing device is unable to communicate via a second access point of a second network via which the computing device was previously communicating;
   determining whether a beacon operator has requested tracking of the computing device;
   in response to determining that the beacon operator has requested tracking of the computing device:
      determining a first geographical location of the first network in which the first access point is located, the first geographical location being different from a second geographical location of the second network in which the second access point is located;
      generating a second message that comprises the first geographical location of the first network; and
      transmitting the second message to the beacon operator.

2. The method of claim 1, wherein the first message comprises one or more of a first identifier for the computing device or a second identifier for a user of the computing device.

3. The method of claim 2, wherein determining whether the beacon operator has requested tracking of the computing device comprises:
   transmitting a third message comprising one or more of the first identifier or the second identifier to the beacon operator.

4. The method of claim 3, wherein determining whether the beacon operator has requested tracking of the computing device further comprises:
   receiving a request to track the computing device based on the third message.

5. The method of claim 1, further comprising:
   authenticating the computing device, wherein the second message is transmitted when the beacon operator has requested tracking of the computing device and when the computing device is authenticated.

6. The method of claim 5, wherein authenticating the computing device comprises:
   transmitting an authentication request to the computing device; and
   receiving an authentication reply from the computing device.

7. The method of claim 6, wherein the second message further comprises the authentication reply.

8. The method of claim 1, further comprising:
   identifying the beacon operator based on the first message.

9. The method of claim 1, further comprising:
   wherein the first network comprises a first wireless network,
   wherein the second network comprises a second wireless network, and
   wherein the first message is indicative that the computing device is out-of-coverage with the second wireless network.

10. The method of claim 1, wherein determining the first geographical location of the first network is performed without receiving data from a tracking device of the computing device.

11. A method comprising:
    receiving a first message from a network operator, the first message indicating that a computing device has been detected communicating via a first access point of a first network, the first network being associated with a first geographical location in which the first access point is located that is different from a geographical location of a home network of the computing device in which a home access point is located;

determining whether to request tracking of the computing device based on the first message;

upon determining to request tracking of the computing device:
- generating a request to track the computing device;
- generating a second message that comprises the request to track the computing device; and
- transmitting the second message to the network operator.

12. The method of claim 11, wherein the first message comprises one or more of a first identifier for the computing device or a second identifier for a user of the computing device.

13. The method of claim 12, wherein determining whether to request tracking of the computing device comprises:
- comparing one or more of the first identifier or the second identifier with account information associated with the one or more of the first identifier or the second identifier; and
- determining to request tracking of the computing device based on the account information.

14. The method of claim 11, further comprising:
receiving a third message from the network operator, the third message comprising the first geographical location associated with the first network.

15. The method of claim 14, further comprising:
transmitting an authentication request for the computing device to the network operator.

16. The method of claim 11, wherein the second geographical location is indicative of a home, school, or business location for the computing device.

17. An apparatus comprising:
one or more processors; and
a memory comprising instructions that when executed cause the one or more processors to perform operations comprising:
- receiving a first message from a computing device via a first access point of a first network associated with a first geographical location in which the first access point is located, the first message being indicative that the computing device is unable to communicate via a second access point of a second network associated with a second geographical location in which the second access point is located;
- determining whether a beacon operator has requested tracking of the computing device; and
- in response to determining that the beacon operator has requested tracking of the computing device:
  - determining the first geographical location in which the first access point is located;
  - generating a second message that comprises the first geographical location in which the first access point is located; and
  - transmitting the second message to the beacon operator.

18. The apparatus of claim 17, further comprising:
wherein the second network comprises a home network of the computing device, and
wherein the second geographical location is indicative of a home, school, or business location for the computing device.

19. The apparatus of claim 17, wherein the operations further comprise:
generating an authentication request;
transmitting the authentication request to the computing device;
receiving an authentication reply from the computing device upon transmitting the authentication request; and
determining that the authentication reply is valid, wherein the second message is transmitted to the beacon operator upon determining that the authentication reply is valid.

20. The apparatus of claim 17, wherein the first message comprises one or more of a first identifier for the computing device or a second identifier for a user of the computing device; and
wherein determining whether the beacon operator has requested tracking comprises:
- transmitting a third message comprising one or more of the first identifier or the second identifier to the beacon operator; and
- receiving a request to track the computing device based on the third message.

* * * * *